United States Patent
Collingwood et al.

(10) Patent No.: US 7,812,736 B2
(45) Date of Patent: Oct. 12, 2010

(54) MACHINE TOOL PROBE

(75) Inventors: David Collingwood, Stroud (GB); Jonathan Paul Fuge, Bristol (GB); Geoffrey Salt, Bristol (GB)

(73) Assignee: Renishaw PLC, Wooten-under-Edge (GB)

( * ) Notice: Subject to any disclaimer, the term of this patent is extended or adjusted under 35 U.S.C. 154(b) by 0 days.

(21) Appl. No.: 12/318,691

(22) Filed: Jan. 6, 2009

(65) Prior Publication Data

US 2009/0140873 A1    Jun. 4, 2009

Related U.S. Application Data

(63) Continuation of application No. 11/478,661, filed on Jul. 3, 2006, now Pat. No. 7,486,195, which is a continuation of application No. 10/362,572, filed as application No. PCT/GB02/00465 on Feb. 1, 2002, now Pat. No. 7,145,468.

(30) Foreign Application Priority Data

Feb. 2, 2001    (GB)    .................. 0102750.7
May 30, 2001    (GB)    .................. 0112998.0

(51) Int. Cl.
*G08B 21/00*    (2006.01)
(52) U.S. Cl. ................. 340/686.1; 340/689; 340/686.5; 340/680; 340/679
(58) Field of Classification Search .................. None
See application file for complete search history.

(56) References Cited

U.S. PATENT DOCUMENTS

| | | | | |
|---|---|---|---|---|
| 3,582,749 | A | * | 6/1971 | Wenzel .................. 318/571 |
| 3,756,122 | A | * | 9/1973 | Campbell .................. 409/128 |
| 3,878,983 | A | * | 4/1975 | Hamill et al. .................. 700/180 |
| 4,044,289 | A | * | 8/1977 | Wenzel et al. .................. 318/571 |
| 4,145,816 | A | | 3/1979 | Stobbe et al. |
| 4,153,998 | A | | 5/1979 | McMurtry |

(Continued)

FOREIGN PATENT DOCUMENTS

DE    200 03 960 U1    8/2000

(Continued)

OTHER PUBLICATIONS

Extended European Search Report issued Nov. 9, 2006 for European Application No. 06013217.2-2006.

*Primary Examiner*—Julie Lieu
(74) *Attorney, Agent, or Firm*—Oliff & Berridge, PLC

(57) ABSTRACT

A probe has internal circuitry capable of operating in a plurality of different modes, for example a variety of filter modes and turn off modes. A switch on the probe sends an input to a controller which is arranged to set the mode in response to operation of the switch. The switch may be a push button which is operated externally of the probe by means of an actuator in the form of a plunger. The probe has a workpiece-contacting stylus mounted on a seat from which it is deflectable. The stylus and the seat may comprise the switch. An indicator, e.g., an LED, indicates the mode in response to an output from the controller. The controller outputs a plurality of indications of different modes in a sequence and a mode is selected by operating the switch once the desired mode is indicated.

20 Claims, 6 Drawing Sheets

U.S. PATENT DOCUMENTS

| | | | |
|---|---|---|---|
| 4,179,602 A * | 12/1979 | Maruyama et al. | 219/125.1 |
| 4,268,824 A * | 5/1981 | Phillips | 340/604 |
| 4,408,617 A * | 10/1983 | Auguste | 600/548 |
| 4,555,610 A * | 11/1985 | Polad et al. | 219/121.61 |
| 4,599,524 A | 7/1986 | McMurtry | |
| 4,625,417 A | 12/1986 | Cusak | |
| 4,790,816 A * | 12/1988 | Sundblom et al. | 604/31 |
| 4,831,364 A * | 5/1989 | Shinohara et al. | 340/680 |
| 5,375,863 A * | 12/1994 | Chapman | 280/99 |
| 5,402,582 A | 4/1995 | Raab | |
| 5,412,880 A | 5/1995 | Raab | |
| 5,418,730 A | 5/1995 | Mariani et al. | |
| 5,469,849 A * | 11/1995 | Sasaki et al. | 600/443 |
| 5,526,576 A * | 6/1996 | Fuchs et al. | 33/503 |
| 5,581,235 A * | 12/1996 | Hollstein | 340/477 |
| 5,611,147 A | 3/1997 | Raab | |
| 5,720,285 A * | 2/1998 | Petersen | 600/459 |
| 5,724,264 A * | 3/1998 | Rosenberg et al. | 702/152 |
| 5,739,654 A | 4/1998 | Doran et al. | |
| 5,760,355 A * | 6/1998 | Glowczewski et al. | 200/61.54 |
| 5,778,550 A | 7/1998 | Carli et al. | |
| 5,880,714 A | 3/1999 | Rosenberg et al. | |
| 5,954,686 A * | 9/1999 | Garito et al. | 604/37 |
| 6,058,076 A * | 5/2000 | Komninos | 367/135 |
| 6,108,613 A | 8/2000 | Kimura et al. | |
| 6,131,299 A | 10/2000 | Raab et al. | |
| 6,209,410 B1 * | 4/2001 | Suzuki | 74/473.18 |
| 6,260,432 B1 * | 7/2001 | Ehrmaier et al. | 74/473.18 |
| 6,301,796 B1 | 10/2001 | Cresson | |
| 6,370,789 B1 | 4/2002 | Madlener et al. | |
| 6,385,508 B1 * | 5/2002 | McGee et al. | 700/254 |
| 6,427,553 B1 * | 8/2002 | Hogberg et al. | 74/471 XY |
| 6,487,785 B1 * | 12/2002 | Ritz | 33/561 |
| 6,572,637 B1 * | 6/2003 | Yamazaki et al. | 607/89 |
| 6,623,433 B2 * | 9/2003 | Webler et al. | 600/467 |
| 6,996,432 B2 * | 2/2006 | Ostrovsky et al. | 600/424 |
| 7,145,468 B2 * | 12/2006 | Collingwood et al. | 340/680 |
| 7,486,195 B2 * | 2/2009 | Collingwood et al. | 340/680 |
| 7,665,219 B2 * | 2/2010 | Styles et al. | 33/503 |
| 2004/0000189 A1 * | 1/2004 | Proksch et al. | 73/105 |
| 2006/0243034 A1 * | 11/2006 | Chand et al. | 73/104 |

FOREIGN PATENT DOCUMENTS

| | | |
|---|---|---|
| EP | 0 337 669 A2 | 10/1989 |
| EP | 0 337 670 A2 | 10/1989 |
| EP | 0 872 787 A1 | 10/1998 |
| EP | 1 058 438 A1 | 12/2000 |
| EP | 1 130 557 A2 | 9/2001 |
| GB | 2 141 365 A | 12/1984 |
| JP | A-08-261745 | 10/1996 |
| JP | A-08-509292 | 10/1996 |
| JP | A-11-094533 | 10/1996 |
| JP | A-09-512336 | 2/1997 |
| JP | A-11-002514 | 1/1999 |
| JP | A-2000-035305 | 2/2000 |

* cited by examiner

MACHINE TOOL PROBE

This is a Continuation of application Ser. No. 11/478,661, filed Jul. 3, 2006, which in turn is a continuation of application Ser. No. 10/362,572, filed Feb. 24, 2003, which in turn is a National Stage Application of PCT/GB02/00465, filed Feb. 2, 2002, which claimed priority from GB 0102750.7, filed Feb. 2, 2001 and GB 0112998.0, filed May 30, 2001. The entire disclosures of the prior applications are hereby incorporated by reference herein in their entirety.

BACKGROUND

This invention relates to probes for use on position determining apparatus such as coordinate measuring machines, measuring robots and in particular machine tools.

An example of such a probe is shown in U.S. Pat. No. 4,153,998. Probes intended for use on machine tools, in which there is a wireless signal transmission system between the probe and the controller of the machine tool, are shown in European Patent Numbers 337669 and 337670.

As such probes have become more complex over the years, there has been a need for them to operate in different modes.

For example, it can be desirable for the signal produced by the probe to be filtered prior to transmitting it to the controller, in order to prevent the generation of spurious signals as a result of vibration. Therefore, the probe may be preset to use different types of filtering, or no filtering, depending on the machine tool and the environment into which it has been installed.

Furthermore, on machine tools such probes are commonly battery operated. The wireless signal transmission system also includes a receiver for receiving a switch-on or start signal. This switches the probe on from a sleeping state in which it consumes very low current, ready for normal use. It is then desirable to switch the probe circuitry off (back to the sleeping state) after use. The probe may have different preset modes, giving different manners in which the circuitry is turned off.

In known probes, such modes are preset by the use of DIP switches on a circuit board internally within the probe. This has a number of disadvantages. In order to change the preset mode, the operator has to dismantle the probe to access the DIP switches. There is a risk that the operator will damage the printed circuit board, and the probe has to be designed to permit such dismantling. Where the DIP switches act on a micro controller to preset the mode, there is a restriction on the number of input lines to the micro controller.

With, say, three such input lines from a three-gang DIP switch, a maximum of eight modes can be preset. Any more modes would require a larger number of input lines to the micro controller. Finally, it would be desirable to provide a pre-setting device which is smaller, less expensive and more reliable than DIP switches.

SUMMARY

The present invention provides a probe for position determining apparatus, having internal circuitry capable of operating in a plurality of different modes, a switch, a controller connected to receive an input from the switch and arranged to preset the mode in response to operation of the switch, an indicator for indicating the mode in response to an output from the controller, the controller being arranged to output a plurality of indications of different modes in a sequence, and to select the mode just indicated upon an operation of the switch.

Preferably, the switch is mounted inside the probe but is operable by an actuator accessible from outside the probe.

In a first embodiment the switch comprises a push button.

In a second embodiment of the invention the probe has a workpiece-contacting stylus mounted on a seat from which it is deflectable, wherein the stylus and the seat comprise said switch. The seat may be kinematic. The controller receives an input from the switch when the stylus is deflected.

Each mode may also include a plurality of different sub-modes. The controller may be arranged to output a plurality of indications of different sub-modes in a sequence and select the sub-mode just indicated upon an operation of the switch.

BRIEF DESCRIPTION OF THE DRAWINGS

Preferred embodiments of the invention will now be described with reference to the accompanying drawings, wherein.

DETAILED DESCRIPTION OF EMBODIMENTS

Figure 1:
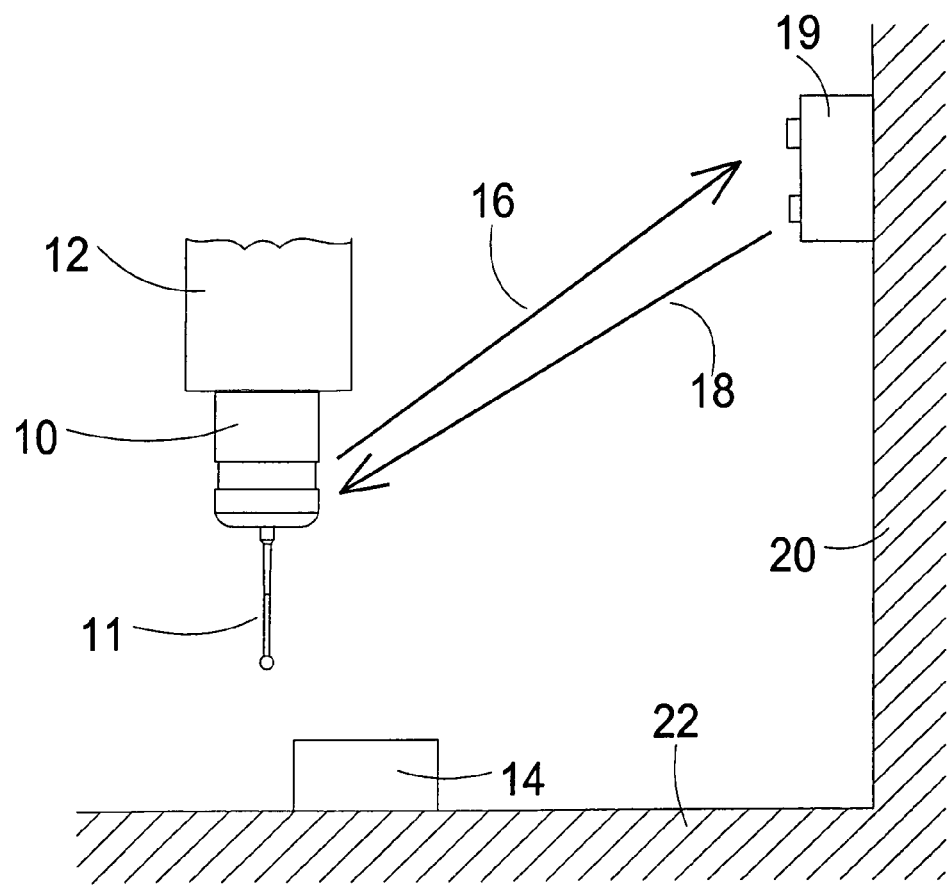
FIG. 1 is a diagrammatic view of a probe on a machine tool.

Referring to FIG. 1, a probe 10 is mounted in the spindle 12 of a machine tool, exchangeably with the normal cutting tools. The spindle 12 can move the probe in three dimensions X,Y,Z, relative to a workpiece 14 clamped on the table or bed 22 of the machine tool. Measurements are made by contact between a stylus 11 of the probe and the workpiece. Measurement signals from the probe are transmitted optically, as indicated by arrow 16, to a receiver module 19 mounted on fixed structure 20 of the machine tool. The module 19 can also transmit an optical (e.g. infrared) switch-on or start signal, indicated by arrow 18, to the probe 10. The probe 10 is battery operated, and remains in a sleeping state until receipt of the switch-on signal 18, whereupon it starts transmitting measurement signals 16.

Figure 2:
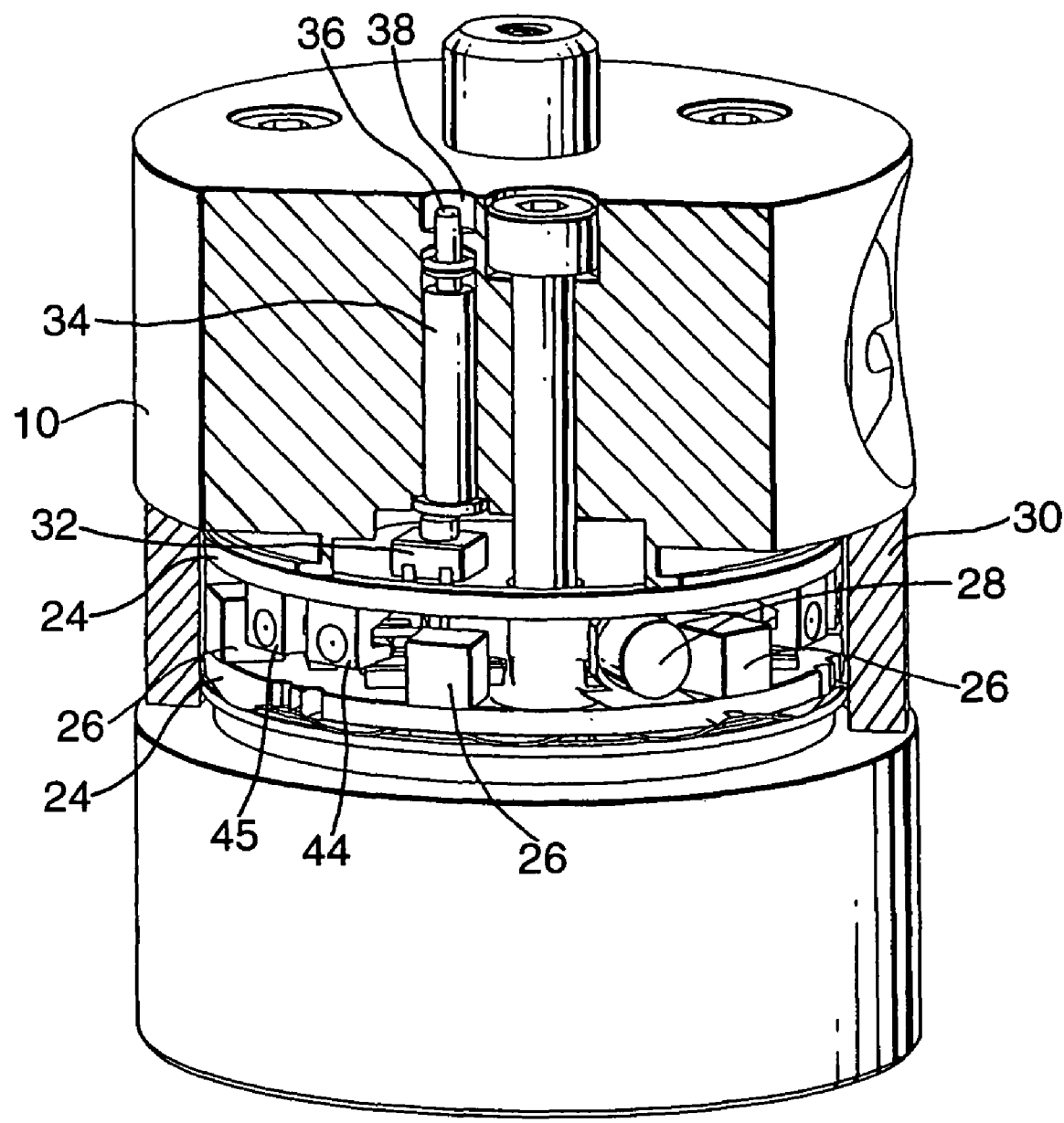
FIG. 2 is a partly sectional view of part of a first embodiment of the probe of FIG. 1.

FIG. 2 shows a first embodiment of the probe 10 in more detail. Internally, it has two circuit boards 24, on which are fitted light emitting diodes 26 for transmitting the optical measurement signals 16. The boards 24 also have a plurality of photodiodes 28 (only one of which can be seen in FIG. 2), for receiving the switch-on signal 18. Furthermore, they have indicators in the form of red and green light emitting diodes (LEDs) 44,45. The light emitting diodes 26, the photodiodes 28 and the indicator LEDs 44,45 are distributed around the circumference of the probe, behind a glass window 30.

One of the circuit boards 24 is provided with a push button switch 32. This can be operated from externally of the probe, by means of an actuator 34 in the form of a plunger. The external end 36 of this plunger lies within a recess 38, and can be actuated by means of a suitable pointed implement.

The following table illustrates various possible modes which can be preset by the use of the push button switch 32.

| | TURN OFF SELECT | | | | FILTER SELECT | | |
| --- | --- | --- | --- | --- | --- | --- | --- |
| MODE | OPTICAL | TIME 10 sec | TIME 30 sec | TIME 134 sec | NO FILTER | ANALOGUE | DIGITAL |
| 1 | ✓ | | | | ✓ | | |
| 2 | ✓ | | | | | ✓ | |
| 3 | ✓ | | | | | | ✓ |
| 4 | | ✓ | | | ✓ | | |
| 5 | | ✓ | | | | ✓ | |
| 6 | | ✓ | | | | | ✓ |
| 7 | | | ✓ | | ✓ | | |
| 8 | | | ✓ | | | ✓ | |
| 9 | | | ✓ | | | | ✓ |
| 10 | | | | ✓ | ✓ | | |
| 11 | | | | ✓ | | ✓ | |
| 12 | | | | ✓ | | | ✓ |

It will be seen that the items which can be selected fall into two groups. Under the heading "turn off select" there are various presettable possibilities for the manner in which probe circuitry is turned off (i.e. returned to its sleeping state in which it no longer transmits measurement signals 16). The first column under this heading indicates modes in which the probe circuitry is turned off by the receipt of another optical signal from the machine-mounted module 19, as indicated by the arrow 18. The remaining columns under this heading indicate that the probe is turned off after a preset period of non-use (i.e. during which the stylus 11 of the probe 10 has not contacted the workpiece 14). In various different modes, the probe may be turned off after periods of 10 seconds, 30 seconds or 134 seconds of non-use.

The final three columns of the above table, labelled "filter select", indicate possible filtering which may be applied to the probe measurement signal before it is transmitted as the optical signal 16. The filtering selected will depend upon the machine to which the probe is installed and the environment. If the installation is not susceptible to vibration, then modes in which no filtering is performed may be preset. Alternatively, in different installations, modes with analogue filtering or digital filtering may be preset.

It will be seen that the table shows 12 possible modes, which between them give all possible combinations of "turn off select" and "filter select".

Figure 3:
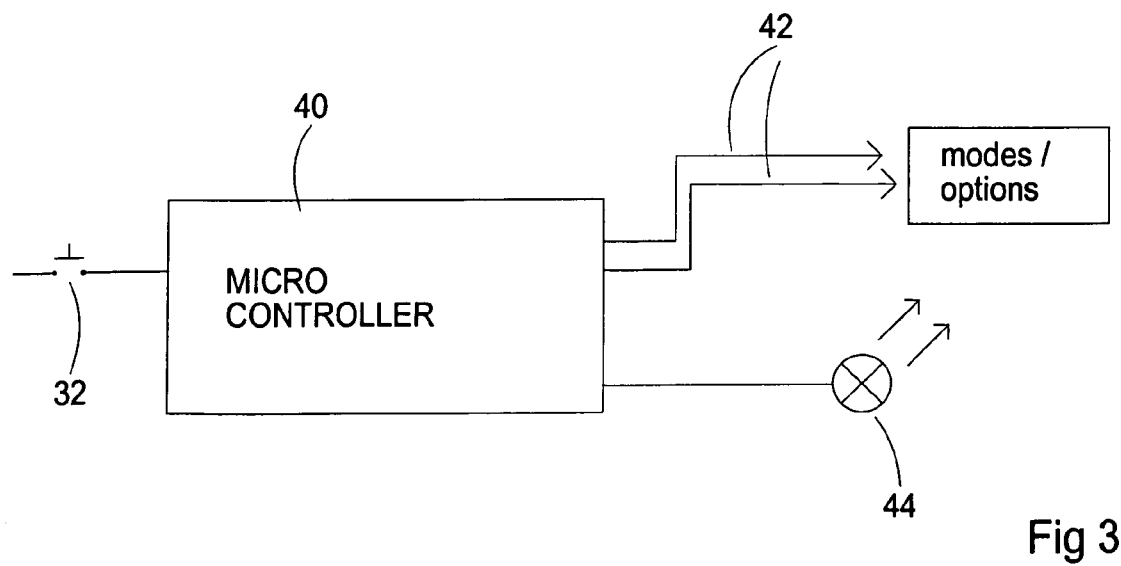
FIG. 3 is a block circuit diagram showing a micro controller within the probe.

The push button 32 provides an input to a micro controller 40, seen in FIG. 3. This has outputs 42 to the remaining circuitry on the circuit boards 24, which provide the various possibilities for turn off and filtering indicated in the above table. It also controls the light emitting diode indicators 44.

Figure 4:
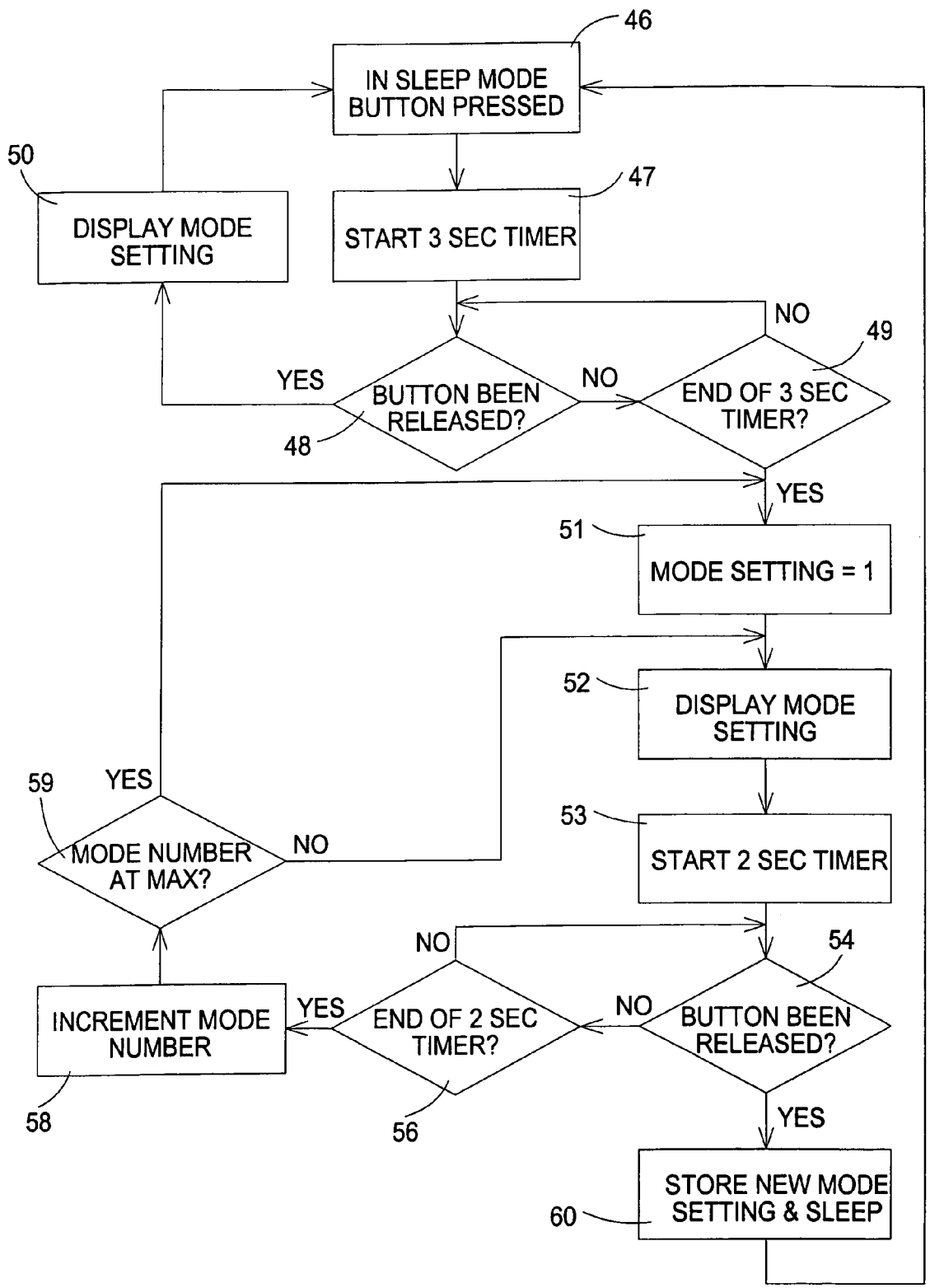
FIG. 4 is a flow chart of a program of the first embodiment which runs in the micro controller.

Referring to FIG. 4, the micro controller 40 acts as follows. In step 46, in the sleeping state, the micro controller's program detects that the button 32 has been pushed. In steps 47,48 and 49, it determines whether the button remains pushed for a period greater than 3 seconds. If the button is released within this 3 second period, then in program step 50 the micro controller outputs signals to the indicator 44 to indicate the current mode which has been preset previously. It does this by flashing the indicator 44 a number of times, corresponding to the mode number indicated in the above table (e.g. 3 flashes for mode 3).

Thus, the operator can obtain an indication of the current mode simply by depressing the button briefly (for less than 3 seconds). If desired, an alternative period such as 5 seconds may be used.

If the button is held depressed for more than 3 seconds, the program enters a loop comprising steps 51 to 59. Firstly, step 51 sets the mode number to 1, and step 52 provides an output to the indicator 44 to indicate this mode. Alternatively, step 51 may be omitted and the loop can start with the mode currently set. As in step 50, the mode is indicated by a corresponding number of flashes of the indicator 44.

Next, in steps 53,54 and 56, the program pauses, for example for 2 seconds, while checking the state of the button. If the button is released during this pause, (step 54) the program exits the loop, and in step 60 the micro controller provides outputs on the lines 42 to preset the filters and the turn off circuits of the probe. It does so in accordance with the mode last set in step 51.

If, in step 56, the button has not been released at the end of the 2 second pause, then the loop continues, via program step 58 which increments the mode number. Should the maximum number of modes have been exceeded, then step 59 returns to the loop via step 51, which resets the mode number to 1. The new mode is now indicated in step 52, and steps 53,54 and 56 pause to see if the operator releases the button.

Mode selection is therefore a very easy process for the operator. He simply presses the button, and holds it depressed while the program cycles through all the possible modes. He releases the button immediately after the mode required has been indicated. Thus, if he requires mode 5, he releases the button after the part of the cycle in which the indicator 44 flashes five times.

Of course, modifications are possible. In the above description, each time the program passes through step 52 it flashes for a number of times corresponding to the mode number (once for mode 1, five times for mode 5, etc). It may instead simply flash once on each pass through this program step. The operator then effectively counts the number of times that the program passes around the loop 52,53,54,56,58, releasing the button 32 at the appropriate time.

It is also possible to provide a more sophisticated indicator 44, giving a numerical indication, instead of a number of flashes.

It will also be appreciated that the modes indicated in the table above are intended merely as examples. Other aspects of the operation of the probe may be preset in the various modes, in addition or instead of the filtering and the turn off method.

The push button 32 in this preferred embodiment overcomes the problems of DIP switches discussed in the introduction.

Figure 5:
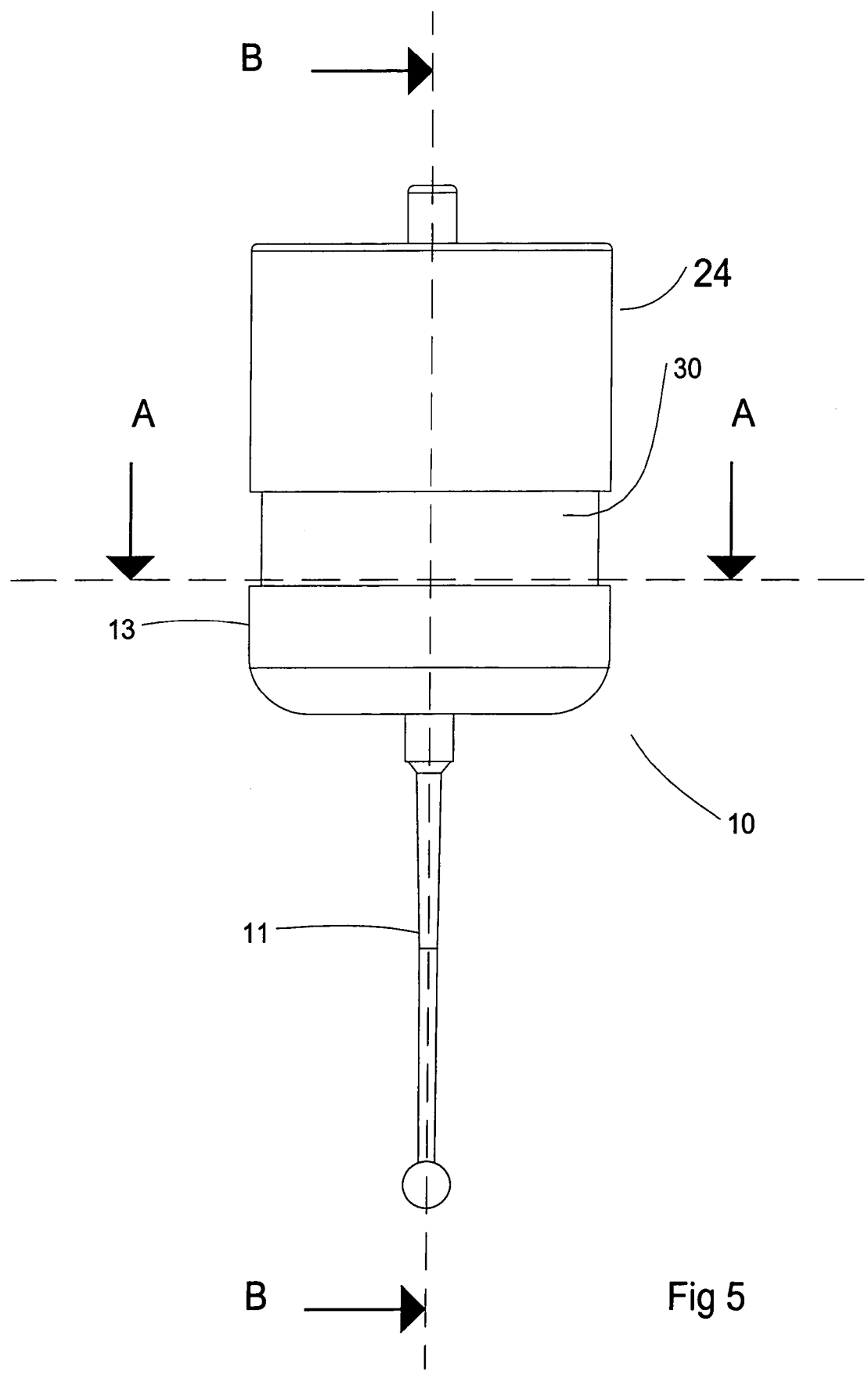
FIG. 5 is a side view of the second embodiment of the probe.
Figure 6:
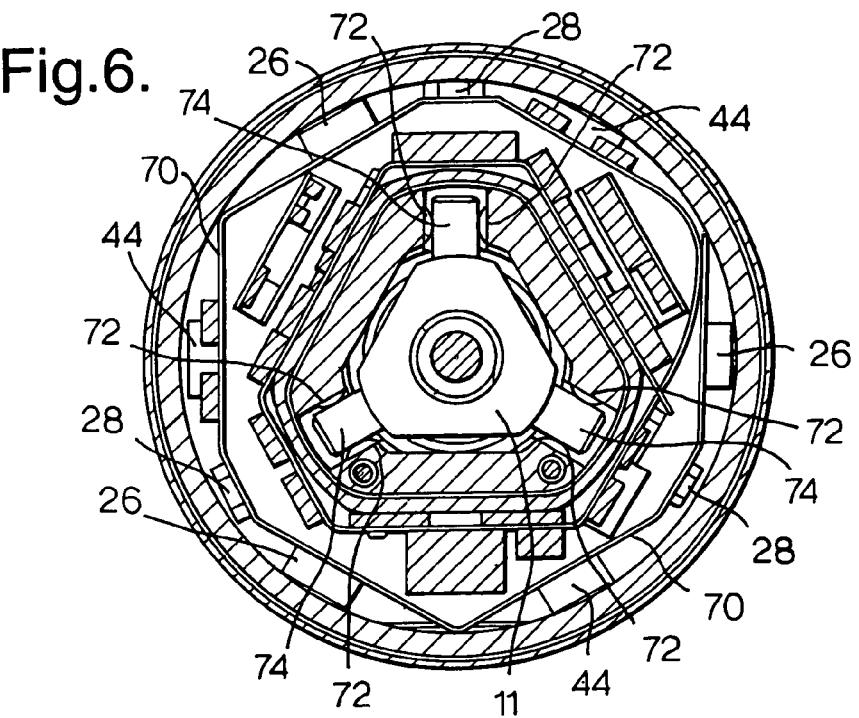
FIG. 6 is a sectional view of the probe of FIG. 5 through A-A.
Figure 7:
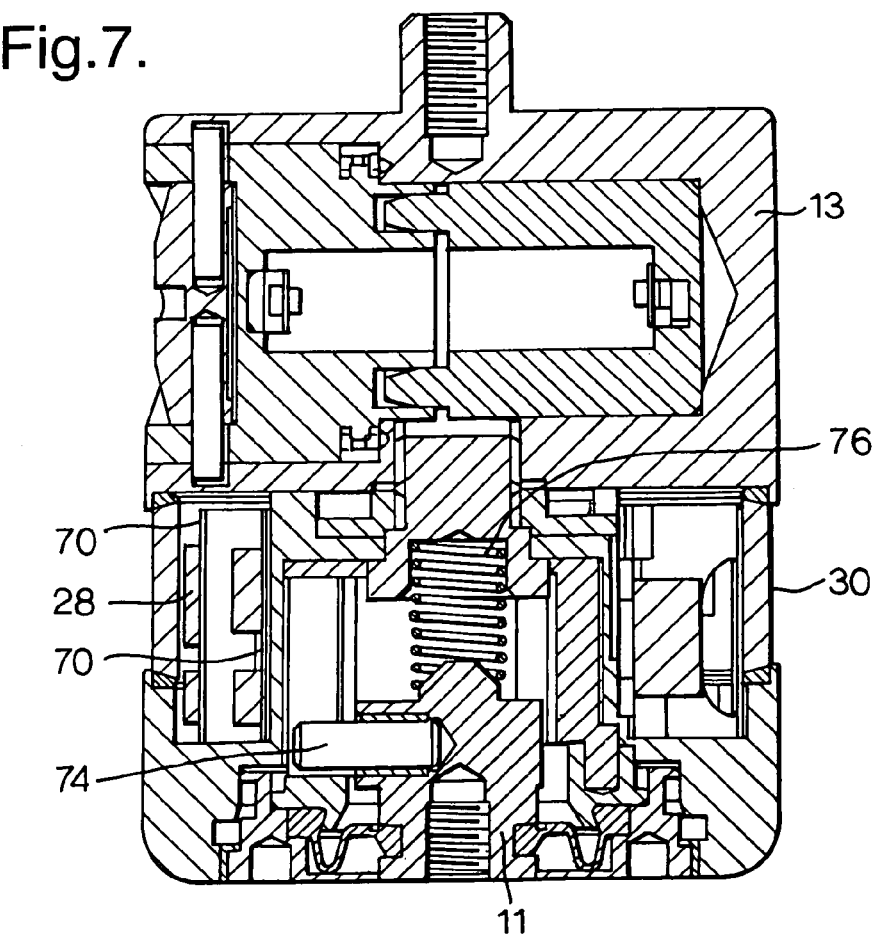
FIG. 7 is a sectional view of the probe of FIG. 5 through B-B.

A second embodiment of the probe 10 is shown in FIGS. 5-7. FIGS. 6 and 7 are sections along the lines A-A and B-B respectively shown in FIG. 5. The probe 10 comprises a housing 24 and a stylus 11.

The electronics are mounted on a flexible material 70 which is positioned in a compact spiral arrangement along the inside circumference of the probe housing. The electronics include light emitting diodes 26 for transmitting the optical measurement signals 16, a plurality of photodiodes 28 for receiving the switch-on signal 18 and indicators 44 in the form of red and green light emitting diodes for indicating the mode. The light emitting diodes 26, photodiodes 28 and indicators 44 are distributed around the circumference of the probe behind a glass window 30.

The stylus 11 is mounted on a kinematic seat inside the housing. The kinematic seat comprises three vee-shaped grooves each formed between a pair of ball bearings 72. The stylus has three cylindrical members 74 extending radially from its upper end which are urged into contact with the vee-shaped grooves by a spring 76. This defines the rest position of the stylus 11. Such an arrangement is well known and described in U.S. Pat. No. 4,153,998.

When the stylus is in this rest position an electric circuit which passes in series from one vee-shaped groove to the next adjacent one is completed. Each member is insulated from the stylus and other members and completes the circuit between the two sides of each respective vee-shaped groove. Deflection of the stylus results in at least one of the members breaking contact with the ball bearings and thus breaking the circuit. As described in U.S. Pat. No. 4,153,998 the breaking of the circuit is used to provide an input pulse to an automatic switching arrangement and thereby indicate that deflection of the stylus has occurred. In the present invention, this arrangement may also be used as a switch for changing between different preset modes, for example for selecting turn-off modes or selecting different filters.

The following table illustrates various possible modes which can be preset by using the probe stylus.

| MODE | OPTION |
| --- | --- |
| Turn-off mode select | Optical off |
|  | Short timeout |
|  | Medium timeout |
|  | Long timeout |
| Probe filter select | Probe filter on |
|  | Probe filter off |
| Start filter select | Start Rejection filter on |
|  | Start Rejection filter off |

In this example there are three modes each mode having several options. The first mode in the table selects the turn-off method and has four options for pre-setting the manner in which the probe circuitry is turned off, as described in the previous embodiment. In the first option the probe circuitry is turned off following an optical signal from the machine mounted module as indicated by arrow 18 in FIG. 1. The remaining options indicate that the probe is turned off after a preset period of non-use, i.e. during which the probe stylus has not contacted the workpiece. For example, for a short time-out the probe turns off after about 10 seconds of non-use. A medium time-out may be about 30 seconds, and a long time-out may be about 134 seconds of non-use.

The second mode in the table is probe filter select as described in the previous embodiment. In this mode the options are the probe filter may be on or off.

The third mode in the table is the start signal filter select. This filter enables the probe to distinguish between the start signal (18 in FIG. 1) and other external influences, such as light from fluorescent light bulbs, which may be confused with the start signal. However this filter introduces a time delay and thus may not be required when external influences are insignificant. In this mode, the options are the start signal filter may be on or off. Such a filter is disclosed in our European Patent Application No. 1130557.

As shown in FIG. 3 the stylus is used as a switch 32 to provide an input to a micro-controller 40. This micro-controller sends outputs 42 to the circuitry in the probe which allows different modes to be selected and different options within each mode to be selected. The micro-controller also controls the light emitting diode indicators 44 which flash different signals to indicate the different modes and options.

Figure 8:
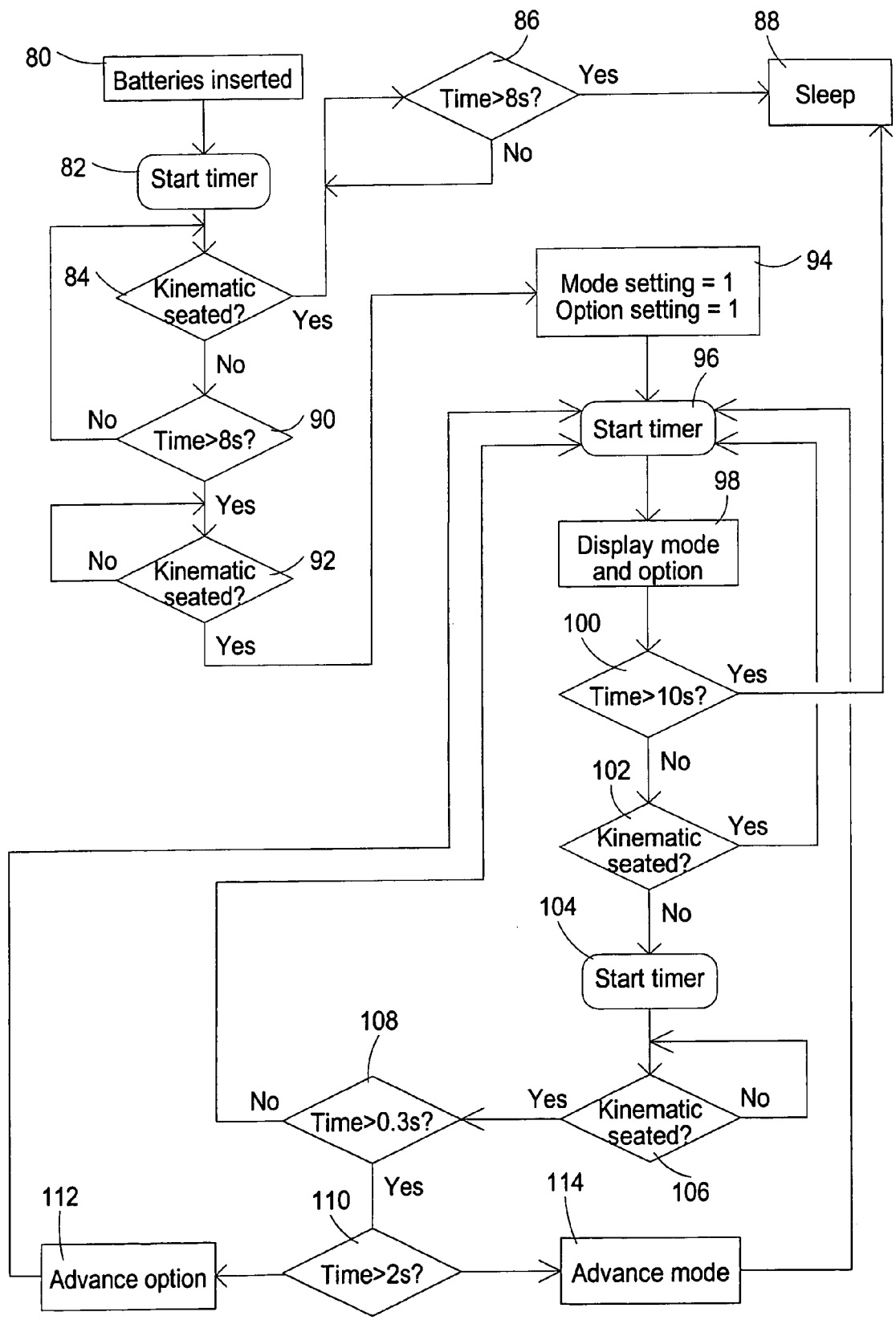
FIG. 8 is a flow chart of a program of the second embodiment which runs in the micro-controller.

Referring to FIG. 8, the micro-controller 40 acts as follows. The micro-controller is in a sleep mode 88 until it detects a battery being inserted 80 in the probe which starts a first timer 82. If the kinematic remains seated 84 (i.e. the stylus remains undeflected) for longer than 8 seconds 86, the probe will return to the sleep mode 88. However if the kinematic is unseated 84 for longer than 8 seconds 90, then once the kinematic has reseated 92 the mode and option will both be set to the first mode and option respectively 94 and the micro-controller will enter the mode and option setting loop 96-114. Alternatively this step can be omitted and the loop can start with the mode and option currently set.

Thus the micro-controller is activated by inserting the battery and the mode and option setting loop of the controller is entered by deflecting the stylus for a time period of eight seconds and then returning the stylus to its rest position.

When the mode and option setting loop 96-114 is entered a second timer is started 96 and the mode and option are displayed 98 by the indicator. As in the previous embodiment the indicator comprises LEDs. If more than 10 seconds has elapsed 100 without the kinematic unseating, then the micro-controller will return to its sleep mode 88.

If the kinematic unseats 102 within 10 seconds 100 then a third timer is started 104. If the kinematic reseats within 0.3 seconds 108, the micro-controller will return to the beginning of the loop at 96. If the kinematic has been unseated for greater than 0.3 seconds but less than 2 seconds 110 then the option is advanced 112. If the kinematic has been unseated for greater than 2 seconds then the mode is advanced.

Thus once the micro-controller is in the mode and option setting loop, the option and mode may be advanced by deflecting the stylus for a short time period (i.e. for advancing the option) or a longer time period (i.e. for advancing the option).

Once either the mode or option are advanced, the micro-controller returns to the beginning of the loop 96-114. The second timer is started 96 and the new mode and option are displayed 98. The loop is exited if the kinematic remains seated for 10 seconds 100. Otherwise the micro-controller continues around the loop until the desired mode and option have been selected.

The function of the first, second and third timers 82,96,104 may all be carried out by a single timer.

Use of the stylus on its kinematic mount as a switch has several advantages. This arrangement is compact and so the size of the probe is able to be reduced. In addition, the kinematics for the stylus are part of the existing probe and thus no additional parts are needed.

In the above description the indicator flashes a number of times corresponding to the mode number and option number each time it cycles through the different modes and options. It is also possible to provide a more sophisticated indicator giving a numerical indication instead of a number of flashes.

The above example has three modes, each mode having several options. Therefore the micro-controller can cycle between the three modes until the desired mode is selected and then cycle between the options of that mode until the desired option is selected. This is much quicker than cycling through every option of every mode in turn. The modes and options in the table are intended merely as examples. Other aspects of the operation of the probe may be preset in the various modes in addition or instead of the filtering and turn-off method.

What is claimed is:

1. A method of operating a machine tool probe, the machine tool probe having a deflectable stylus and being capable of operating in a plurality of modes of operation, the method comprising:
   setting a mode of operation of the machine tool probe by deflecting the stylus of the machine tool probe.

2. The method according claim 1, wherein the machine tool probe includes an indicator, the method further comprising:
   flashing the indicator to indicate the mode of operation of the machine tool probe.

3. The method according to claim 1, wherein the setting the mode of operation includes setting the mode and a sub-mode of operation of the machine tool probe.

4. The method according to claim 1, further comprising initially inserting a battery into the machine tool probe.

5. The method according to claim 1, wherein the setting the mode of operation of the machine tool probe includes setting a manner in which the circuitry of the machine tool probe is turned off.

6. The method according to claim 1, wherein the setting the mode of operation of the machine tool probe includes setting a filtering to be applied to the probe measurement signal.

7. The method according to claim 1, wherein the measurement probe enters a programming loop when the stylus is deflected for more than three consecutive seconds.

8. The method according to claim 1, wherein the setting the mode of operation of the machine tool probe includes the measurement probe entering a programming loop that cycles through all the possible modes of operation of the measurement probe whilst the stylus is deflected.

9. The method according to claim 8, wherein the setting the mode of operation of the machine tool probe includes releasing the stylus while the desired mode is indicated.

10. The method according to claim 1, wherein each of the plurality of modes include sub-modes and options, wherein the setting the mode of operation of the machine tool probe includes deflecting the stylus for a short time to advance an option and deflecting the stylus for a longer time to advance the mode.

11. A measurement probe for a position determining apparatus, the measurement probe comprising:
   a surface sensor having a deflectable surface contacting stylus;
   internal circuitry capable of operating in a plurality of different modes;
   a switch; and
   a controller connected to receive an input from the switch and arranged to set a mode in response to an operation of the switch,
   wherein the switch is disposed inside the probe and can be operated from outside the probe without dismantling the probe.

12. The measurement probe according to claim 11, wherein the switch includes a push button switch.

13. The measurement probe according to claim 11, further comprising an actuator that is accessible from outside the probe, wherein the switch is operated by the actuator.

14. The measurement probe according to claim 13, wherein the actuator includes a plunger having an external end that is accessible from outside the measurement probe.

15. The measurement probe according to claim 14, wherein the external end of the plunger lies within a recess and can be actuated using a pointed implement.

16. The measurement probe according to claim 11, wherein the internal circuitry includes a wireless transmission system and the plurality of different modes include a plurality of different wireless transmission modes.

17. The measurement probe according to claim 14, wherein the wireless transmission system includes an optical transmission system.

18. The measurement probe according to claim 11, further comprising a numerical indicator for indicating the mode of operation of the internal circuitry.

19. A measurement probe for a position determining apparatus, the measurement probe comprising:
   a surface sensor having a deflectable surface contacting stylus;
   internal circuitry capable of operating in a plurality of different modes;
   a switch disposed inside the probe;
   a controller connected to receive an input from the switch and arranged to set a mode in response to an operation of the switch; and
   a numerical indicator for indicating the mode of operation of the internal circuitry.

20. The measurement probe according to claim 19, further comprising:
   an actuator accessible from outside the probe, wherein the switch is mounted inside the probe and is operated by the actuator.

* * * * *